United States Patent Office 3,054,746
Patented Sept. 18, 1962

3,054,746
SEPARATION OF DISSIMILAR METAL IONS
Elmer L. Gaden, Jr., Brightwaters, N.Y., and Robert W. Schnepf, Coytesville, N.J., assignors to Radiation Applications, Inc., New York, N.Y., a corporation of New York
No Drawing. Filed May 6, 1959, Ser. No. 811,265
10 Claims. (Cl. 210—44)

This invention relates to a process of separating an ionic material from an aqueous medium containing one or more dissimilar ionic substances by a technique designated hereinafter as foam distillation.

In some industrial operations, an aqueous by-product containing trace amounts of dissimilar metal ions is produced, and it is desirable to recover one of the metal ions. Such a problem exists, for example, in the radiation field, where it is usual to find trace amounts of calcium and strontium in the waste streams of plant operations, and it is necessary to recycle the same through the main operation for recovery of the desired radioactive metal ion. The cost of recovering a trace amount of radioactive metal ion by the recycle technique is greatly out of proportion to the value of the recovered material. Furthermore, by present techniques the cost factor is greatly enhanced, when it is necessary to recover only one of the two or more metal ions which are present. The need for an economical and efficient method for recovery of one of two or more dissimilar ions in trace amounts in an aqueous system is great, and for that reason the present invention is proposed.

Thus, an object of this invention is to provide a method of recovering an ionic substance from an aqueous medium containing two or more dissimilar ions in an economical and efficient manner.

Other objects and advantages will become apparent from the following description and explanation thereof.

In our copending application Ser. No. 699,914, now abandoned, we disclose a method of recovering non-surface active metal ions from solution. However, in this method it is difficult to separate closely related metals such as those of the same periodic group, for example magnesium, calcium, barium, etc. from each other as well as from the solution.

By means of the present invention the recovery of an ionic substance from an aqueous medium containing two or more dissimilar ionic substances is contemplated by the method of combining the aqueous medium with a chelating agent to cause the ionic substance of highest complex number to chelate therewith to form a chelated product having no surface activity; then combining the aqueous medium with a surface active agent to cause the other ionic substance to combine therewith to produce a product having surface activity which will thereby concentrate at the surface as a relatively rich layer of the aqueous medium; and separating the rich layer from the aqueous medium.

The ionic material to be separated may be anionic or cationic in nature and water soluble. For the most part, the ionic material will be inorganic, but it can also be organic in character. For example, the ions of organic-metallic compounds, such as the salts of organic acids, can be treated by the process of this invention. The only requirement is that the material be ionic in character. The principal application of this process will be to ions of metals in groups II, III, IV, VI, VII or VIII of the periodic table, and these may be present in salts, such as the halides, nitrates, or the soluble sulphates, carbonates or the like. In the field of radioactive materials, strontium is an important element which can be separated by this process. Like other alkaline earth metal ions, it may be present in the aqueous streams as a halide, e.g., a chloride.

The ionic material may be present in the aqueous stream in varied concentrations, and preferably below the saturation level. The most economical and efficient application of our process is to the separation of small quantities of ionic material, i.e., not more than about 1%, and usually about $10^{-5}$ molar and up to about 1% by weight, based on the total aqueous stream. Conventional processes are very inferior economically to the present process in this range of ionic concentration. In the nuclear field, the ionic material is usually present in trace quantities such as, for example, from about 50 to 200 p.p.m., and the present process may be used effectively for separation of ionic material of such low concentrations.

The ionic substances enumerated above have different capacities or abilities to chelate with chelating agents. The order in which they chelate may be designated as the complex number, meaning that the ion having the greatest complexing ability will have the highest number, and all other ions follow in descending order correlative to their ability to complex. In other words, the complex number reflects the stability of the complex and reflects the magnitude of the equilibrium constant for the complexing reaction. Various publications exist in which the order of complexing for the various metal ions are given, namely, "Chemistry of the Metal Chelate Compounds" by Martell and Calvin, published by Prentice-Hall, Inc., Englewood Cliffs, New Jersey (1956), pages 192, 194 and 196; and "Stability Constants of Metal-Ion Complexes," Part I, "Organic Liquids," Bjerrum, J., Schwarezenbach, G., and Sillen, L. G., The Chemical Society, London, Special Publication No. 6, 1957. The following scale, measured by means of ethylenediaminetetraacetic acid, exemplifies the order of complexing ability for various metals, the first mentioned being of lowest ability and the last being of highest order.

| | | | |
|---|---|---|---|
| $Na^+$ a | $La^{+++}$ | $Y^{+++}$ | $Ti^{++}$ |
| $Li^+$ | $Ce^{+++}$ | $Pb^{++}$ | $Zr^{++}$ |
| $Tl^+$ | $Al^{+++}$ | $Pd^{++}$ | $Ga^{+++}$ |
| $Az^+$ | $Co^{++}$ | $Ni^{++}$ | $Ti^{+++}$ |
| $Eu^{++}$ | $Pr^{+++}$ | $Dy^{+++}$ | $Hg^{++}$ |
| $Ba^{++}$ | $Zn^{++}$ | $Ho^{+++}$ | $Cr^{+++}$ |
| $Sr^{++}$ | $Nd^{+++}$ | $Cu^{++}$ | $Sc^{+++}$ |
| $Mg^{++}$ | $Cd^{++}$ | $Er^{++}$ | $Th^{++}$ |
| $V^{++}$ | $Sn^{+++}$ | $Hf^{++}$ | $Fe^{+++}$ |
| $Ca^{++}$ | $Eu^{+++}$ | $Tn^{+++}$ | $In^{+++}$ |
| $Mn^{++}$ | $Gd^{+++}$ | $Yb^{+++}$ | $V^{+++}$ |
| $Fe^{++}$ | $Tb^{+++}$ | $Lu^{+++}$ | $Co^{+++}$ b | a Lowest.  b Highest.

The chelating or complexing agents to be combined with the ionic substance are of themselves not surface acitve and the complex products are also not surface active. Various agents may be employed, including such classes as the water soluble aliphatic dicarboxylic acids, aliphatic polyamines or more specifically the alkyl polyamines, the aromatic polyamines, amino polycarboxylic acids, aliphatic hydroxy polycarboxylic acids, the molecularly dehydrated phosphoric acids, etc. The aliphatic dicarboxylic acids such as oxalic acid, malonic acid, succinic acid or any other water soluble alkandioic acid are particularly useful for chelation with ionic substances having a complex number higher than the aluminum ion. The aliphatic polyamines such as the alkylene polyamines, e.g. ethylene diamine, diethylene triamine, etc. are particularly useful for chelation of all metal ions of polyvalence. The aromatic polyamines such as bipyridyl are particularly useful for complexing metal ions having a higher complex number than the aluminum ion. The aliphatic amino polycarboxylic acids, such as ethylenediamine tetraacetic acid, work well for all metal ions. The aliphatic hydroxy acids such as the hydroxy substituted alkanetrioic acids, e.g. citric acid, may preferably be used to complex all metal ions higher than divalent copper.

The molecularly dehydrated phosphoric acids such as tripolyphosphoric acid, pyrophosphoric acid or metaphosphoric acid, may also preferably be used to chelate with metal ions higher than divalent copper. The quantity of chelating or complexing agent to be used will depend upon the amount of metal ion or ionic substance which should be complexed in the aqueous medium. Generally, at least the stoichiometric amount needed to complex with all of the desired metal ion is employed, and an excess of up to about 10% may also be used. The reaction or complex takes place at ambient level, or if desired, the reaction may occur at an elevated temperature, should it be desirable for any reason to do so.

In the separation treatment, the ionic substance having the highest or higher complex number is combined with the chelating agent, thus leaving one or more dissimilar metal ions free in solution. With one kind of metal ion tied up as a complex, it is practical to add a surface active agent to combine with the metal ion which is to be separated from the aqueous medium. It can be seen that the chelating agent is chosen on the basis of having the strongest attraction for one kind of metal ion, and so the resulting complex product is unaffected by the surface active agent. In turn, the surface active agent is chosen from the standpoint that it will react with the particular ion to be separated from the aqueous medium and will not affect significantly and other unassociated metal ion which may be in solution.

The surface active agent includes, for example, proteins, peptized proteins, anionic or cationic detergents or soaps, etc. The surface active agents are a well known class of compounds which any person skilled in the art would readily recognize. The ability of these compounds to combine with ionic materials is also known, but it has never been appreciated that this well known property could be utilized for ionic separation through the method of this invention. Similarly, the selectivity of one surface active agent for particular ionic materials requires no elaboration here, because of the considerable treatment of this subject in the prior art.

To illustrate further the types of surface active agents which are useful for the purpose of this invention, the following may be cited: the water soluble aromatic sulphonates of sodium or potassium; the aliphatic sulphonates of sodium or potassium containing 8 to 24 carbon atoms; the aliphatic sulphates of sodium or potassium containing 8 to 25 carbon atoms; the sodium or potassium salts of the alkyl substituted benzene ethoxylated sulphonic acids in which 1 to 10 ethoxy groups and 1 to 18 carbon atoms in the alkyl group are present; the aliphatic ethoxylated sodium or potassium sulphonates in which the aliphatic group contains 8 to 24 carbon atoms and the compound contains 1 to 4 ethoxy groups; the alkyl substituted quaternary ammonium salts; the sodium or potassium salts of fatty acids containing 8 to 24 carbon atoms; etc.

The surface active agent is added to the aqueous stream containing the ionic material in an amount which is at least sufficient to combine with all of the ionic material, and preferably an excess of surface active agent is employed to enhance the surface active property of the product.

The product resulting from combining the ionic material with the surface active agent must also be a surfactant in order that it will concentrate at the surface of the aqueous stream. Usually the concentration of the surfactant product diminishes with distance from the surface of the aqueous stream, and it is generally true that the greatest concentration of surfactant is at the surface. Having the ionic material attached or combined with the surface active agent, it can be separated by skimming off a layer of liquid from the surface of the aqueous stream, or as preferred in this invention, pass a gasiform material through the aqueous stream to cause foaming and then remove the foam in typical distillation fashion.

The gasiform material can be any gas or vaporous material which is safe to handle. Additional criteria are that it be cheap, and otherwise will not react with the surfactant to cause undue complications. The gasiform material can be steam, air, nitrogen, carbon dioxide, normally gaseous hydrocarbon, argon, helium, etc. A normally gaseous material is preferred because the separation is most economically conducted at ambient temperature level and it is easier to separate such gaseous material from the liquid.

In order to provide a better understanding of this invention, reference will be had to the following specific examples.

*Example 1*

In solutions containing both $Ca^{++}$ and $Sr^{++}$, most foaming complexing agents will either have a preference for $Ca^{++}$ or have approximately similar attractions for both $Ca^{++}$ and $Sr^{++}$. In this case $Ca^{++}$ may be considered "heavier." To remove $Sr^{++}$ from solution, sufficient ethylenediaminetetraacetic acid was added to chelate all the $Ca^{++}$, but essentially none of the $Sr^{++}$. The foaming agent, in this case sodium o-hydroxyphenyl butyl benzene sulphonate "Areskap 100," is then added (at a concentration of 0.6 gm./liter), the solution foamed by passing nitrogen through it and the $Sr^{++}$ collected in the foam. The results of experiments on this system are given below.

| | Starting Concentration | Enrichment Ratio (foam conc./bulk conc.) | |
|---|---|---|---|
| | | Without EDTA addition | With EDTA |
| Run (a): | | | |
| $Ca^{++}$ | $9.5 \times 10^{-5}M$ | 1.5 | 1.28 |
| $Sr^{++}$ | $9.5 \times 10^{-5}M$ | 2.9 | 3.7 |
| Run (b): | | | |
| $Ca^{++}$ | $4 \times 10^{-4}M$ | 1.5 | 1.2 |
| $Sr^{++}$ | $4 \times 10^{-5}M$ | 2.4 | 3.33 |

*Example 2*

In solutions containing both $Ni^{++}$ and $Co^{++}$ most foaming-complexing agents will either have a preference for $Ni^{++}$ or have approximately similar attraction for both $Ni^{++}$ and $Co^{++}$. In this case $Ni^{++}$ may be considered "heavier." To remove $Co^{++}$ from solution, sufficient ethylenediamine is added thereto to chelate all the $Ni^{++}$, but essentially none of the $Co^{++}$. The foaming agent, in this case sodium-N-methyl-N- "coconut oil acid" taurate, "Igepon TC 42," is then added (at a concentration of 0.8 gm./liter), the solution foamed by means of nitrogen gas and the $Co^{++}$ collected in the foam.

| | Starting Concentration p.p.m. | Enrichment Ratio (foam conc./bulk conc.) | |
|---|---|---|---|
| | | Without EDTA addition | With EDTA |
| Run (a): | | | |
| $Ni^{++}$ | 500 | ~1.1 | 1.02 |
| $Co^{++}$ | 100 | ~1.1 | 1.45 |
| Run (b): | | | |
| $Ni^{++}$ | 250 | ~1.2 | 1.12 |
| $Co^{++}$ | 50 | ~1.2 | 1.75 |

Having thus provided a written description along with specific examples of the invention, the scope thereof is defined by the appended claims.

What is claimed is:

1. A process which comprises combining a water soluble chelating agent with an aqueous medium containing dissimilar soluble metal ions and thereby forming a non-surface active chelated product with the metal ion of highest complex number, combining a surface active agent with the aqueous medium containing the complex product and thereby forming a soluble surface active product with the metal ion to be separated from the aqueous medium without affecting the chelated product, and separating the surface active product from the aqueous medium.

2. The process of claim 1 wherein the chelating agent is selected from the group consisting of aliphatic dicarboxylic acid, aliphatic polyamine, aromatic polyamine, aliphatic hydroxy substituted polycarboxylic acid, aliphatic amino polycarboxylic acid, and molecular dehydrated phosphoric acid.

3. The process of claim 1 being further characterized by passing a gasiform material through the aqueous medium and thereby causing the surface layer to foam and separating the foam from the aqueous medium.

4. The process of claim 3 wherein the metal ions are present in amounts of not more than about 1% by weight.

5. The process which comprises combining a water soluble chelating agent with an aqueous medium containing dissimilar alkaline earth metal ions in amounts of about 50 to 200 p.p.m. to produce a non-surface active chelated product with the alkaline earth metal ion of higher complex number, combining a surface active agent with the aqueous medium containing the chelated product to form a surface active product with the non-chelated alkaline earth metal ion and separating the surface active product from the aqueous medium.

6. The process of claim 5 wherein the surface active agent is an ionic sulphonate.

7. The process of claim 5 wherein the surface active agent is an ionic sulphonate and the chelating agent is selected from the group consisting of aliphatic dicarboxylic acid, aliphatic polyamine, aromatic polyamine, aliphatic hydroxy substituted polycarboxylic acid, aliphatic amino polycarboxylic acid and molecularly dehydrated phosphoric acid.

8. The process of claim 1 wherein the chelating agent is alkylene amino polycarboxylic acid and the surface active agent is an ionic sulphonate.

9. The process of claim 7 being further characterized by passing a gasiform material through the aqueous medium and thereby forming a foam and separating the foam from the aqueous medium.

10. A process which comprises combining ethylenediaminetetraacetic acid with an aqueous medium containing calcium and strontium ions in trace amounts and thereby complexing the calcium ions, combining a water soluble ionic sulphonate with the aqueous medium to produce a water soluble, surface active product with the strontium ions and thereby concentrate at the surface layer of the aqueous medium, and passing a gasiform material through the aqueous medium to produce a foam, and separating the foam by passage through a transfer zone from the surface of the aqueous medium.

References Cited in the file of this patent

UNITED STATES PATENTS 2,820,759     Monet ------------------ Jan. 21, 1958

OTHER REFERENCES

Gaudin: "Flotation," 2nd Ed., February 19, 1957, McGraw-Hill, New York, pages 553 and 554 relied on.

Dognon: Revue Scientifique (1941), vol. 79, pages 613–619.

"The Versenes"—Bersworth Chemical Co., Framingham, Massachusetts, Technical Bulletin No. 2, pages 4–7 of Sect. 1 and pages 57–58 of Sect. 2 relied on.